US011487501B2

(12) United States Patent
Chen et al.

(10) Patent No.: US 11,487,501 B2
(45) Date of Patent: Nov. 1, 2022

(54) DEVICE CONTROL USING AUDIO DATA

(71) Applicant: Snap Inc., Santa Monica, CA (US)

(72) Inventors: Xin Chen, Torrance, CA (US); Yurii Monastyrshyn, Santa Monica, CA (US); Fedir Poliakov, Marina Del Rey, CA (US); Shubham Vij, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 521 days.

(21) Appl. No.: 15/981,295

(22) Filed: May 16, 2018

(65) Prior Publication Data

US 2019/0354344 A1 Nov. 21, 2019

(51) Int. Cl.
G06F 3/16 (2006.01)
G06F 3/0482 (2013.01)
G06N 3/08 (2006.01)
G06N 3/04 (2006.01)
G10L 15/08 (2006.01)
G10L 15/16 (2006.01)
G06T 11/00 (2006.01)

(52) U.S. Cl.
CPC ............ G06F 3/167 (2013.01); G06F 3/0482 (2013.01); G06N 3/0445 (2013.01); G06N 3/08 (2013.01); G06T 11/001 (2013.01); G10L 15/08 (2013.01); G10L 15/16 (2013.01); G10L 2015/088 (2013.01)

(58) Field of Classification Search
CPC ......... G06F 3/167; G06F 3/0482; G06N 3/08; G06N 3/0445; G10L 2015/088; G10L 15/16; G10L 15/08; G06T 11/001
See application file for complete search history.

(56) References Cited

U.S. PATENT DOCUMENTS 5,754,939 A    5/1998   Herz et al.
6,038,295 A    3/2000   Mattes
6,158,044 A    12/2000  Tibbetts
6,167,435 A    12/2000  Druckenmiller et al.
(Continued)

FOREIGN PATENT DOCUMENTS

CA        2887596 A1    7/2015
CN     112154411 A     12/2020
(Continued)

OTHER PUBLICATIONS

W3C, "Voice Browsing", published on Oct. 14, 2008 at https://www.w3.org/standards/webofdevices/voice, retrieved Oct. 26, 2021 (Year: 2008).*

(Continued)

Primary Examiner — Shourjo Dasgupta
(74) Attorney, Agent, or Firm — Schwegman Lundberg & Woessner, P.A.

(57) ABSTRACT

An audio control system can control interactions with an application or device using keywords spoken by a user of the device. The audio control system can use machine learning models (e.g., a neural network model) trained to recognize one or more keywords. Which machine learning model is activated can depend on the active location in the application or device. Responsive to detecting keywords, different actions are performed by the device, such as navigation to a pre-specified area of the application.

20 Claims, 16 Drawing Sheets

(56) References Cited

U.S. PATENT DOCUMENTS

| | | |
|---|---|---|
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,283,973 B1* | 10/2007 | Loghmani ............... G06Q 30/00 704/270.1 |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,720,683 B1* | 5/2010 | Vermeulen ............... G10L 15/22 704/235 |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,530,410 B1* | 12/2016 | LeBeau ................ G10L 15/22 |
| 9,532,171 B2 | 12/2016 | Allen et al. |
| 9,537,811 B2 | 1/2017 | Allen et al. |
| 9,560,006 B2 | 1/2017 | Prado et al. |
| 9,582,080 B1* | 2/2017 | Tilton .................... G06F 3/015 |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,672,497 B1* | 6/2017 | Lewis ................... G06F 40/284 |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,916,831 B2* | 3/2018 | Panin ..................... G10L 15/22 |
| 9,946,699 B1* | 4/2018 | Dye ...................... G06Q 40/123 |
| 9,961,520 B2 | 5/2018 | Brooks et al. |
| 9,979,894 B1* | 5/2018 | Kokemohr ............ G06T 11/001 |
| 9,986,394 B1* | 5/2018 | Taylor ..................... H04W 4/18 |
| 10,210,885 B1* | 2/2019 | Carlson ................. G06F 9/546 |
| 10,482,904 B1 | 11/2019 | Hardie .................. G10L 15/22 |
| 10,621,282 B1* | 4/2020 | Selfridge ............... G10L 15/26 |
| 10,643,615 B2* | 5/2020 | Pan ....................... G10L 15/22 |
| 10,706,848 B1* | 7/2020 | Greene .................. G06N 20/00 |
| 10,762,903 B1* | 9/2020 | Kahan ................... G10L 15/26 |
| 10,777,203 B1* | 9/2020 | Pasko .................... G10L 15/18 |
| 10,991,371 B2* | 4/2021 | Pan ........................ G06F 3/167 |
| 2002/0047868 A1 | 4/2002 | Miyazawa |
| 2002/0116196 A1* | 8/2002 | Tran ...................... G06F 1/3203 704/270 |
| 2002/0144154 A1 | 10/2002 | Tomkow |
| 2002/0152225 A1* | 10/2002 | Kevan ................... H04N 21/4126 |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0208568 A1* | 9/2007 | Blanchard ............. G10L 21/06 704/270 |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0154870 A1* | 6/2008 | Evermann ............. G10L 15/08 |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2009/0150156 A1* | 6/2009 | Kennewick ............ G10L 15/00 704/257 |
| 2010/0082427 A1 | 4/2010 | Burgener et al. |
| 2010/0114944 A1* | 5/2010 | Adler ..................... G10L 15/22 707/770 |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0131040 A1* | 6/2011 | Huang ................... B60R 16/0373 704/E21.001 |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0289290 A1* | 11/2012 | Chae ..................... G06F 3/0488 455/566 |

(56) References Cited

U.S. PATENT DOCUMENTS

| | | | |
|---|---|---|---|
| 2012/0304080 A1 | 11/2012 | Wormald et al. | |
| 2013/0071093 A1 | 3/2013 | Hanks et al. | |
| 2013/0194301 A1 | 8/2013 | Robbins et al. | |
| 2013/0290443 A1 | 10/2013 | Collins et al. | |
| 2013/0317823 A1* | 11/2013 | Mengibar | G06F 40/242 704/251 |
| 2014/0032682 A1 | 1/2014 | Prado et al. | |
| 2014/0122787 A1 | 5/2014 | Shalvi et al. | |
| 2014/0201527 A1 | 7/2014 | Krivorot | |
| 2014/0244712 A1* | 8/2014 | Walters | G06Q 10/10 709/202 |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2014/0372115 A1* | 12/2014 | LeBeau | H04M 1/72552 704/235 |
| 2015/0058018 A1* | 2/2015 | Georges | G10L 15/08 704/257 |
| 2015/0199082 A1 | 7/2015 | Scholler et al. | |
| 2015/0227602 A1 | 8/2015 | Ramu et al. | |
| 2015/0302856 A1* | 10/2015 | Kim | G10L 25/48 704/273 |
| 2015/0371132 A1 | 12/2015 | Gemello et al. | |
| 2015/0371422 A1* | 12/2015 | Kokemohr | G06T 5/00 382/311 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0203002 A1* | 7/2016 | Kannan | G06F 3/167 715/708 |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2016/0371054 A1* | 12/2016 | Beaumont | G06F 3/013 |
| 2017/0083285 A1* | 3/2017 | Meyers | G10L 15/00 |
| 2017/0102695 A1* | 4/2017 | Hilemon | G05B 23/0264 |
| 2017/0103754 A1* | 4/2017 | Higbie | G06F 3/167 |
| 2017/0161382 A1* | 6/2017 | Ouimet | G11B 27/34 |
| 2017/0163866 A1* | 6/2017 | Johnson | G06F 3/011 |
| 2017/0263029 A1 | 9/2017 | Yan et al. | |
| 2017/0272571 A1* | 9/2017 | Spiessbach | G06F 3/04812 |
| 2017/0287006 A1 | 10/2017 | Azmoodeh et al. | |
| 2017/0295250 A1 | 10/2017 | Samaranayake et al. | |
| 2017/0374003 A1 | 12/2017 | Allen et al. | |
| 2017/0374508 A1 | 12/2017 | Davis et al. | |
| 2018/0012110 A1 | 1/2018 | Souche et al. | |
| 2018/0039478 A1* | 2/2018 | Sung | G06F 3/167 |
| 2018/0040325 A1* | 2/2018 | Melanson | G10L 17/24 |
| 2018/0113672 A1 | 4/2018 | Klein et al. | |
| 2018/0121796 A1* | 5/2018 | Deisher | G06N 3/063 |
| 2018/0164953 A1* | 6/2018 | Su | G06F 3/167 |
| 2018/0210703 A1* | 7/2018 | Meyers | G10L 15/32 |
| 2018/0211658 A1* | 7/2018 | Segal | G10L 15/08 |
| 2018/0217810 A1* | 8/2018 | Agrawal | G06F 3/0482 |
| 2019/0121611 A1* | 4/2019 | Ashoori | G06F 3/167 |
| 2019/0121612 A1* | 4/2019 | Ashoori | G06F 8/38 |
| 2019/0196698 A1* | 6/2019 | Cohen | G10L 15/22 |
| 2019/0295552 A1* | 9/2019 | Pasko | G10L 15/34 |
| 2019/0311720 A1* | 10/2019 | Pasko | G10L 15/32 |

FOREIGN PATENT DOCUMENTS

| | | |
|---|---|---|
| WO | WO-2012000107 A1 | 1/2012 |
| WO | WO-2013008251 A2 | 1/2013 |
| WO | WO-201 4194262 A2 | 12/2014 |
| WO | WO-201 5192026 A1 | 12/2015 |
| WO | 2016048581 | 3/2016 |
| WO | WO-201 6065131 A1 | 4/2016 |
| WO | WO-2016054562 A1 | 4/2016 |
| WO | WO-201 6/112299 A1 | 7/2016 |
| WO | WO-201 6179166 A1 | 11/2016 |
| WO | WO-201 6179235 A1 | 11/2016 |
| WO | WO-201 7176739 A1 | 10/2017 |
| WO | WO-201 7176992 A1 | 10/2017 |
| WO | WO-2018005644 A1 | 1/2018 |
| WO | WO-2019222493 A1 | 11/2019 |

OTHER PUBLICATIONS

Bernard A. Rozmovits, "The Design of User Interfaces for Digital Speech Recognition Software", Digital Technical Journal, vol. 8 No. 2, 117-126, retrieved Feb. 16, 2022 (1996) (Year: 1996).*

Francisco Bernardo et al, "Interactive Machine Learning for End-User Innovation", The AAAI 2017 Spring Symposium on Designing the User Experience of Machine Learning Systems, Technical Reports SS-17-04, 369-375, retrieved Feb. 16, 2022 (2017) (Year: 2017).*

John J. Dudley and Per Ola Kristensson, "A Review of User Interface Design for Interactive Machine Learning", ACM Transactions on Interactive Intelligent Systems, vol. 1, No. 1, Article 1, retrieved Feb. 16, 2022 (Mar. 2018) (Year: 2018).*

Josh Constine, "Instagram Direct unites ephemeral and permanent messaging for 375M users", published on Apr. 11, 2017 at https://techcrunch.com/2017/04/11/instachat-direct, retrieved Feb. 16, 2022 (Year: 2017).*

Dave Vronay, "Ephemeral vs. Perpetual Messaging: Thinking Outside the Timeline", published on Aug. 2, 2015 at https://techcrunch.com/2015/08/02/ephemeral-vs-perpetual-messaging-thinking-outside-the-timeline, retrieved Feb. 16, 2022 (2015) (Year: 2015).*

"International Application Serial No. PCT US2019 032649, International Search Report dated Aug. 2, 2019", 5 pgs.

"International Application Serial No. PCT US2019 032649, Written Opinion dated Aug. 2, 2019", 9 pgs.

"International Application Serial No. PCT/US2019/032649, International Preliminary Report on Patentability dated Nov. 26, 2020", 11 pgs.

"Chinese Application Serial No. 201980032169.6, Voluntary Amendment Filed Mar. 29, 2021", w/ English Claims, 9 pgs.

"European Application Serial No. 19729958.9, Response filed Jul. 1, 2021 to Communication pursuant to Rules 161(1) and 162 EPC dated Dec. 23, 2020", 17 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"Korean Application Serial No. 10-2020-7035717, Notice of Preliminary Rejection dated Jun. 13, 2022", w English Translation, 11 pgs.

"European Appiication Serial No. 19729958.9, Communication Pursuant to Article 94(3) EPC dated Jul. 11, 2022", 17 pgs.

(56) References Cited

OTHER PUBLICATIONS

U.S. Appl. No. 17/876,842, filed Jul. 29, 2022, Device Control Using Audio Data.

* cited by examiner

DEVICE CONTROL USING AUDIO DATA

TECHNICAL FIELD

The present disclosure generally relates to special-purpose machines and improvements to such variants, and to the technologies by which such special-purpose machines become improved compared to other special-purpose machines for device control using terms detected in audio data.

BACKGROUND

Some computers have limited computational resources. For example, smartphones generally have a relatively small screen size, limited input/output controls, and less memory and processor power than their desktop computer and laptop counterparts. Different issues arise when interacting with a computer with limited computational resources. For example, a user may have to drill-down into a number of menus instead of using a keyboard shortcut or simply viewing all the menus at once on a larger screen (e.g., a screen of a desktop). Further, navigating to different user interfaces, different menus, and selecting different user interface elements can be computationally intensive, which can cause the device to lag and further unnecessarily drain the device's battery.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, interacting with computer devices having limited resources can be problematic. To this end, an audio control system can be implemented on the client device to perform actions in response to detecting keywords spoken by a user of the client device. The audio control system can initiate one or more machine learning schemes trained to detect sets of keywords. In some example embodiments, which machine learning scheme is initiated depends on which user interface (UI) is being displayed on the client device. The machine learning schemes can be implemented as neural networks that are trained to perform natural language processing and keyword recognition.

Some embodiments of the machine learning schemes are implemented as template recognition schemes that recognize portions of audio data based on those portions being similar to waveforms in a given template. The audio control system can implement machine learning schemes to navigate to a given area of an application, select an element in the application (e.g., a user interface element, a button), or cause actions to be performed within the application or on the client device in response to keywords being detected. In some example embodiments, the action or content displayed is pre-associated with the keyword of the different machine learning schemes.

In some example embodiments, each of the machine learning schemes is associated with a set of one or more user interfaces, such that when one of the user interfaces is displayed a corresponding machine learning scheme is activated in response. In some example embodiments, an individual machine learning scheme or content associated with a machine learning scheme is updated without updating the other machine learning schemes.

Figure 1:
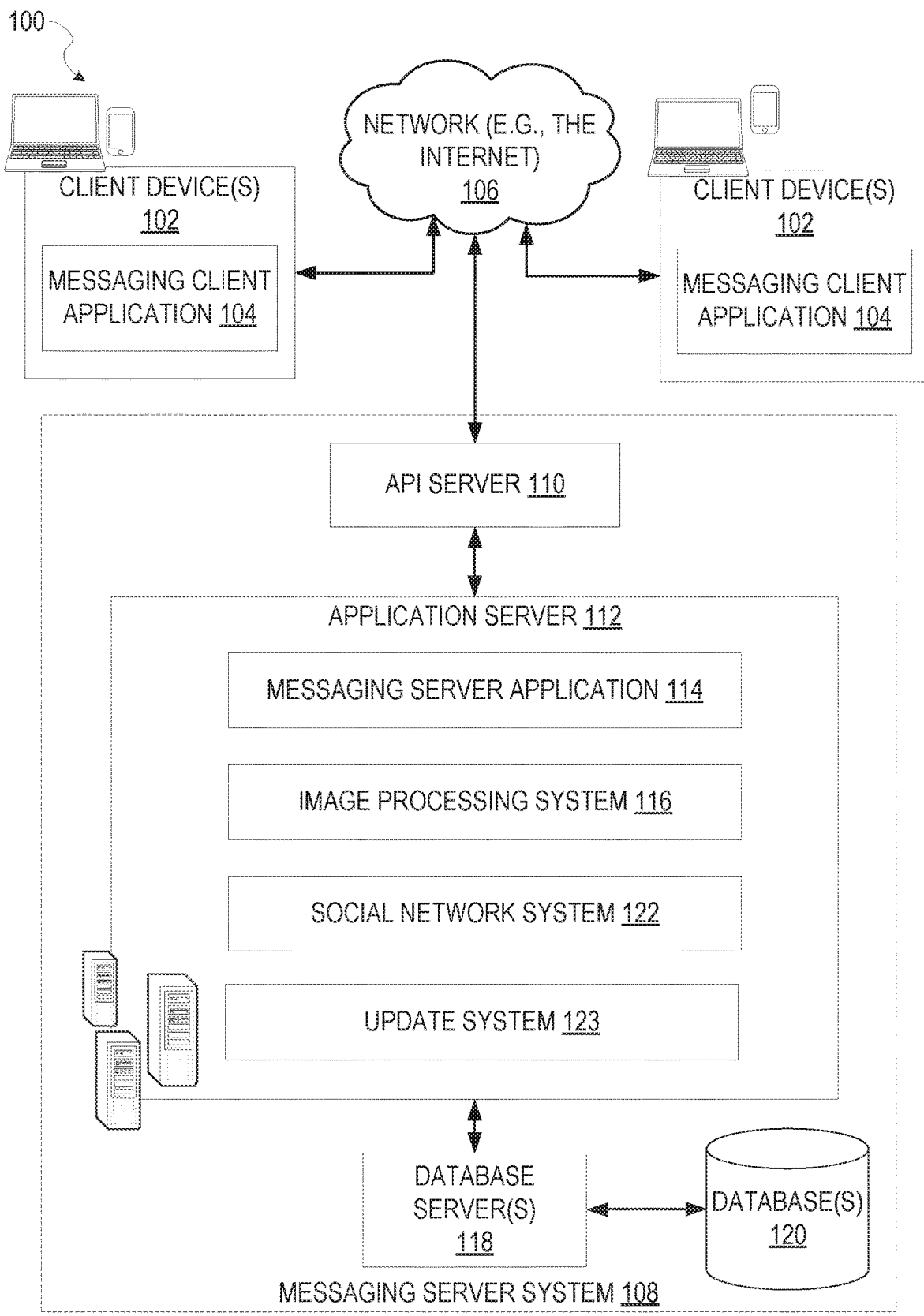
FIG. 1 is a block diagram showing an example messaging system for exchanging data (e.g., messages and associated content) over a network.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108 and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and an update system 123, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The update system 123 manages training and deployment of machine learning schemes and models distributed to a plurality of client devices (e.g., client device 102). In some example embodiments, the update system 123 trains the neural network models on sets of keywords to be recognized on the client device 102. The trained models are then distributed as part of the messaging client application 104 download discussed below, or as an update to the messaging client application 104.

The application server 112 is communicatively coupled to the database server 118, which facilitates access to the database 120 in which is stored data associated with messages processed by the messaging server application 114.

Figure 2:
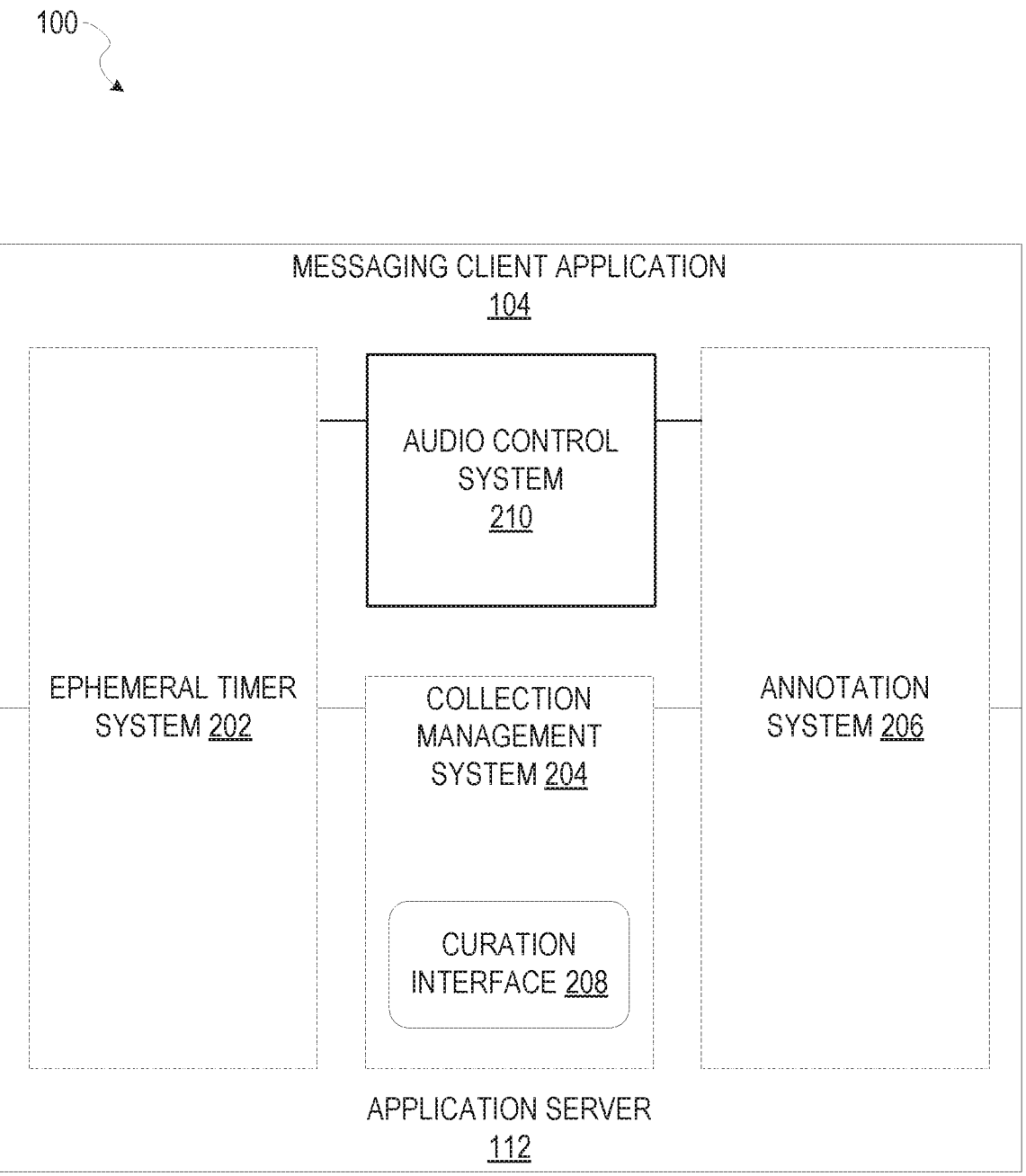
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, an audio control system 210, and a curation interface 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
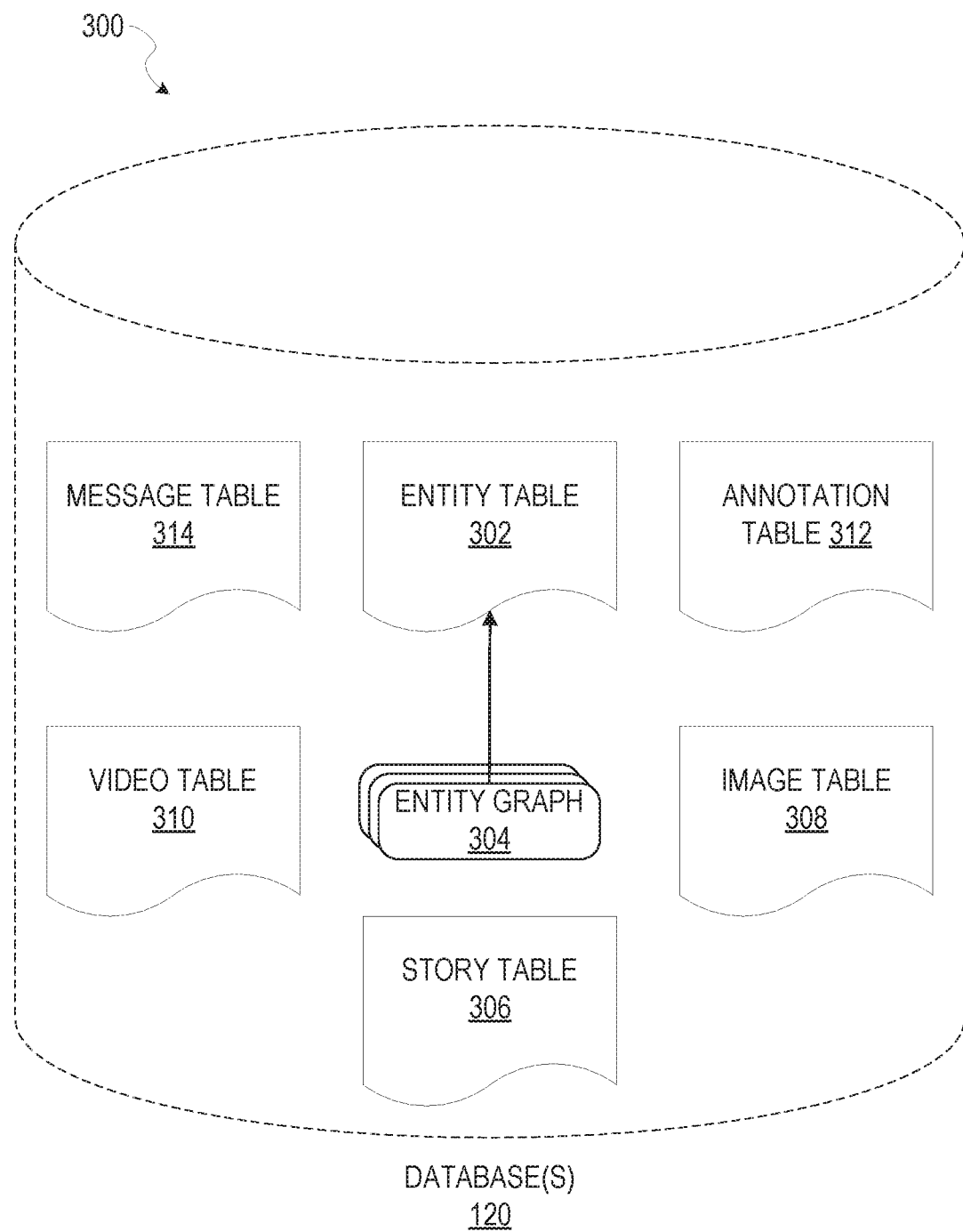
FIG. 3 is a schematic diagram illustrating data that may be stored in a database of a messaging server system, according to certain example embodiments.

FIG. 3 is a schematic diagram illustrating data 300, which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
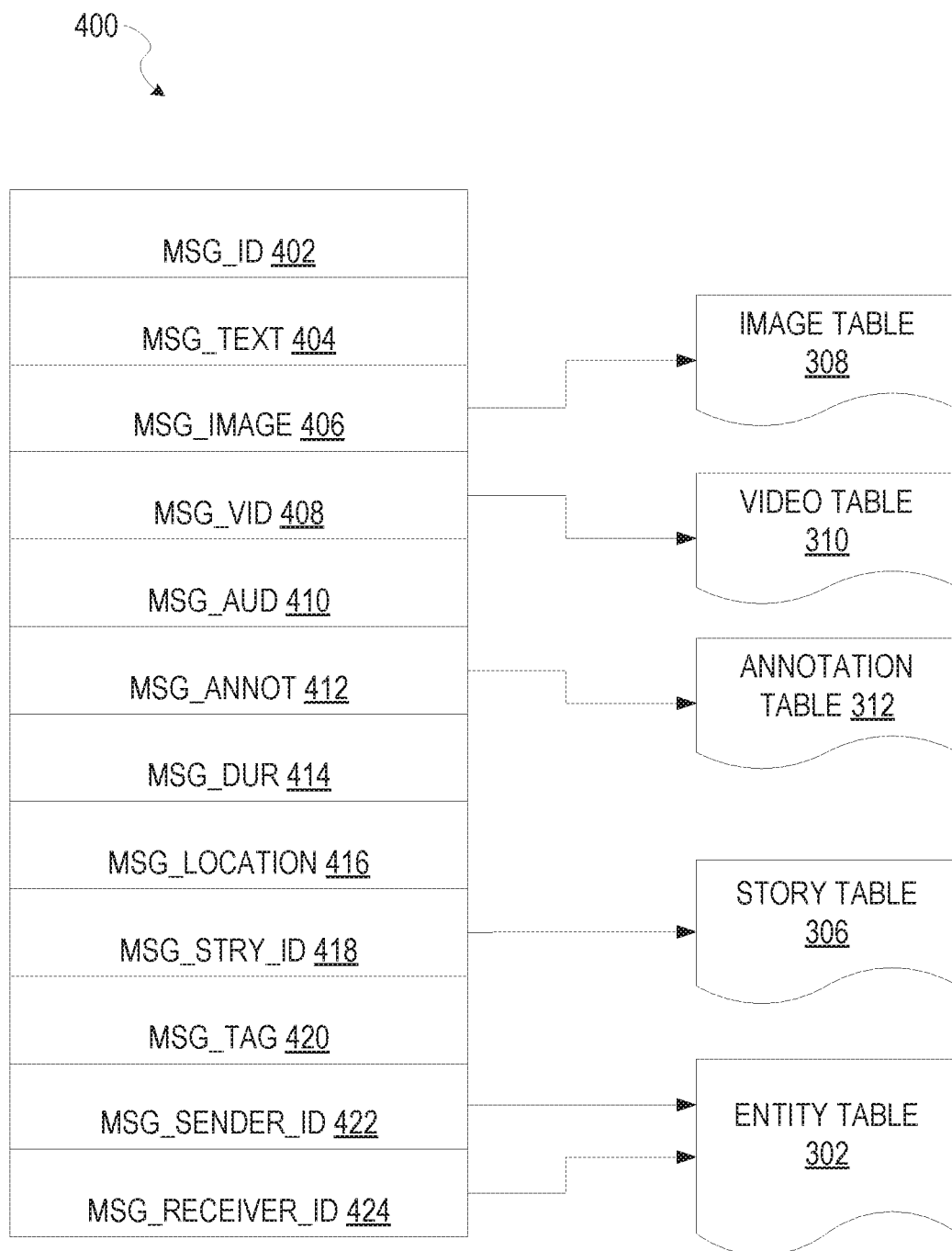
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
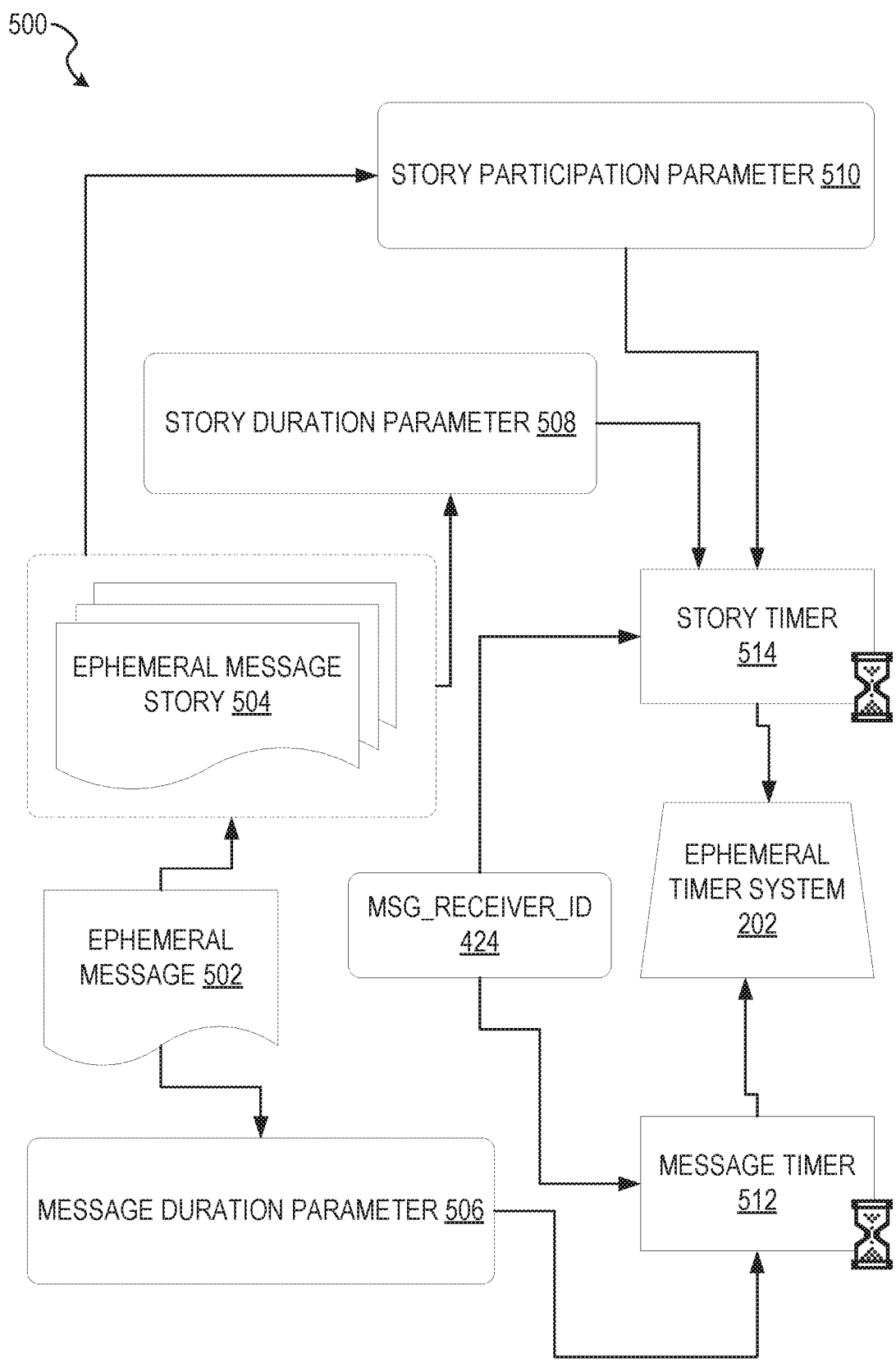
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of ten seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504. The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring (via the story timer 514) in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
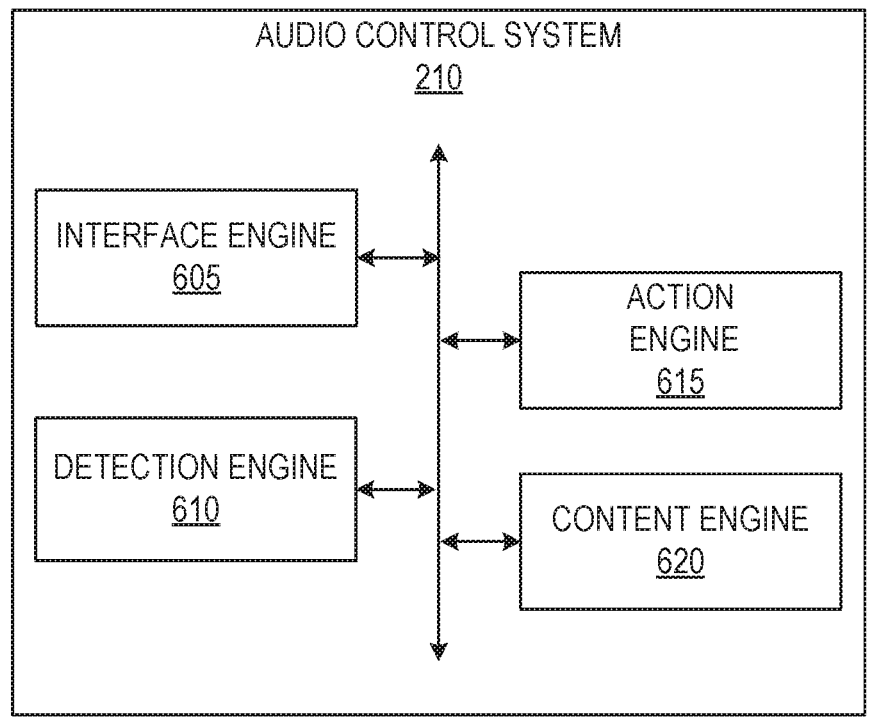
FIG. 6 illustrates internal functional engines of an audio control system, according to some example embodiments.

FIG. 6 illustrates internal functional engines of an audio control system 210, according to some example embodiments. As illustrated, audio control system 210 comprises an interface engine 605, a detection engine 610, an action engine 615, and a content engine 620. The interface engine 605 manages displaying user interfaces and initiating a keyword detection model on the detection engine 610. In some example embodiments, the interface engine 605 is configured to initiate recording of audio data using a transducer (e.g., a microphone) of the client device 102. Further, in some example embodiments, the interface engine 605 is configured to capture one or more images using an image sensor of the client device 102. The images can include an image, video, or live video that is dynamically updated or displayed on a display device of the client device 102.

The detection engine 610 manages detecting keywords in audio data using one or more machine learning schemes. In some example embodiments, the detection engine 610 implements neural networks trained on different sets of keywords to detect a keyword spoken by user and captured in audio data. In some example embodiments, the detection engine 610 uses a template engine that matches portions of the audio data to templates to detect keywords.

The action engine 615 is configured to perform one or more actions in response to a keyword detected by the detection engine 610. For example, in response to a keyword being detected in the audio data, the action engine 615 can trigger the interface engine 605 to capture an image using the image sensor of the client device 102.

As another example, responsive to the detection engine 610 detecting a keyword in the audio data, the action engine 615 can apply an image effect or video filter effect to one or more images currently being displayed on the display device of the client device 102. Further, as an additional example, in response to a keyword being detected in the audio data, the action engine 615 can navigate to a user interface of the messaging client application 104, select a user interface element within the messaging client application 104, or navigate to external network sites (e.g. websites on the Internet).

The content engine 620 manages displaying content pre-associated with the detected keyword. For example, in response to a keyword being detected in audio data, the content engine 620 may display user interface content as an overlay on an image or video being displayed on the display device of the client device 102. The image or video with the overlay content can be shared as an ephemeral message 502 on a network site, such as a social media network site as discussed above.

Figure 7:
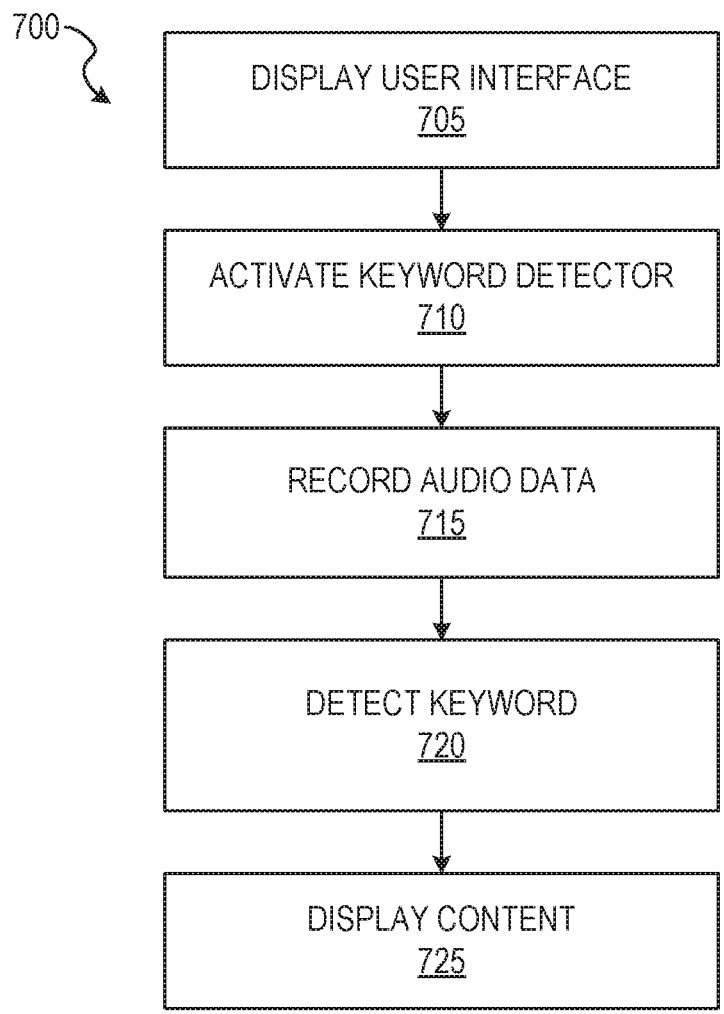
FIG. 7 shows a flow diagram of an example method for implementing application control using audio data, according to some example embodiments.

FIG. 7 shows a flow diagram of an example method 700 for efficiently controlling a computationally limited device (e.g., a smartphone) using an audio control system, according to some example embodiments. At operation 705, the interface engine 605 displays a user interface. For example, at operation 705, the interface engine 605 navigates from a main window of an application active on the client device 102 to an image capture user interface of the application active on the client device 102.

At operation 710, the detection engine 610 activates a keyword detector, such as a machine learning scheme, that is configured to detect keywords. For example, at operation 710, in response to the image capture user interface being displayed at operation 705, the detection engine 610 initiates a recurrent neural network (RNN) trained to detect user-spoken keywords in audio data. In some example embodiments, the keyword detector initiated by the detection engine 610 is a template engine that can match waveforms in recorded audio data to keyword template waveforms.

At operation 715, the interface engine 605 records audio data using a microphone of the client device 102. In some example embodiments, at operation 715, the interface engine 605 records the audio data in a temporary memory that may capture a subset of audio data to conserve memory of the client device 102. For example, thirty-seconds of audio data can be recorded to the buffer, and as new audio data is captured, audio data that is older than thirty seconds is delated or otherwise removed from the buffer. Thirty seconds is used as an example time-period in which the buffer can capture audio data; it is appreciated that in some example embodiments, other time periods (e.g., five seconds, ten seconds, fourth-five seconds) can likewise be implemented. Further, although operation 715 in which audio data is recorded is placed after operation 710 in which the keyword detector is activated, it is appreciated that in some example embodiments, operation 710 and 715 reverse order with the audio data being recorded to a buffer first and then the keyword detector is activated. Likewise, in some example embodiments, the operations of 710 and 715 can be initiated approximately at the same time in response to a user interface being displayed.

At operation 720, the detection engine 610 detects one or more keywords in the audio data. For example, at operation 720, the detection engine 610 implements a neural network to detect that the user of the client device has spoken the keyword "Havarti" (a type of cheese).

At operation 725, in response to the keyword being detected at operation 720, pre-associated content is displayed on the display device of the client device 102. For example, in response to the keyword "Havarti" being detected, the action engine 615 displays a cartoon picture of a block of Havarti cheese on the display device of the client device 102. Which content is pre-associated with which keyword can be tracked in a data structure stored in memory of the client device 102, as discussed in further detail below with reference to FIG. 8.

In some example embodiments, at operation 725, the action engine 615 performs one or more actions to display the content at operation 725. For example, at operation 725, in response to the keyword "Havarti" being detected, the action engine 625 captures an image using a camera on the client device 102, and further displays the captured image as the content of operation 725. As a further example, at operation 725, in response to the keyword "Havarti" being detected, the action engine 625 navigates from a current user interface to another user interface (e.g., a user interface configured to enable the user to take pictures using the client device 102).

In some example embodiments, operation 725 is omitted and content is not displayed. In those example embodiments, instead of displaying content, one or more background actions can be performed in response to a keyword being detected. For instance, in response to detecting the keyword "save" spoken by the user holding the client device 102, the action engine 615 may save the state of a document, image, or other object in a memory of the client device 102.

Figure 8:
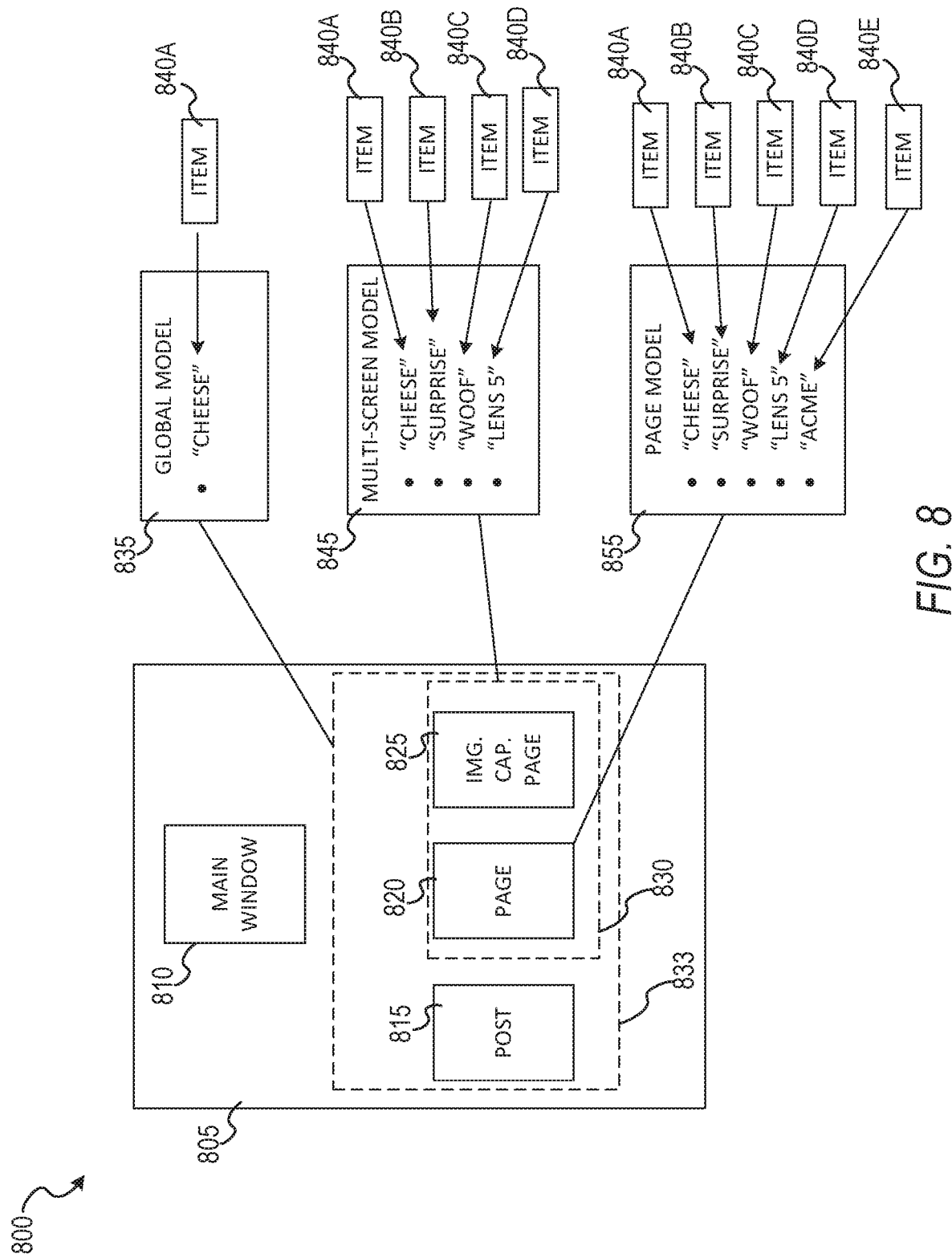
FIG. 8 shows an example functional architecture for implementing application control using model and user interface associations, according to some example embodiments.

FIG. 8 shows an example functional architecture 800 for implementing application control using model and user interface associations, according to some example embodiments. In architecture 800, a plurality of user interfaces 805 of an application are displayed. The application can be an application that controls other applications (e.g., operating system 1502, discussed below), or an application operating on top of an operating system, such as messaging client application 104. The plurality of user interfaces 805 include a main window 810, a post 815, a page 820, and an image capture user interface 825. The main window 810 is an example primary UI for the messaging client application 104 (e.g., a "home" screen). The post 815 is a UI of an example UI of an ephemeral message (e.g., ephemeral message 502), as discussed above. The page 820 can be a UI of a network page, web article, or other network item that is generally viewable for a longer period of time in the messaging client application 104 than the period of time in which the post 815 can be viewed. The image capture user interface 825 is a UI configured to capture images using an image sensor of the client device 102. Although only four user interfaces are discussed in FIG. 8, it is appreciated that in some example embodiments other user interfaces can be included in a similar manner.

In some example embodiments, different sets of keywords are associated with different user interfaces being displayed by the messaging client application 104. For example, architecture 800 displays models 835, 845, and 855. Each of the models are machine learning schemes trained on different sets of keywords. In the example illustrated, global model 835 is a machine learning scheme trained to detect a single keyword, "cheese". In response to detecting the single keyword, the action engine 615 or the content engine 620 implement item 840A, which is pre-associated with the keyword "cheese". For example, upon the keyword "cheese" being detected, the action engine 615 can cause the interface engine 605 to capture an image using an image sensor of the client device 102.

The multiscreen model 845 is a machine learning scheme trained to detect the keywords: "cheese", "surprise", "woof", and "lens 5". As with the global model 835, in response to the machine learning scheme of the multiscreen model 845 detecting any of its keywords, items 840A-840D can be implemented by the action engine 615 or the content engine 620. For example, the keyword "surprise" can be configured as a daily surprise in the messaging client application 104 (e.g., new image effects, new user interface content, new application functionality, coupons, and so on). A user of the client device 102 can open the messaging client application 104 and speak the word "surprise" to cause pre-associated item 840B to be implemented. Similarly, in response to the keyword "woof" being detected, item 840C can be implemented (e.g., in response to "woof" being detected, apply cartoon dog ears as an overlay to an image of the user displayed on the client device 102). Similarly, in response to the keyword "lens 5" being detected, item 840D can be implemented (e.g., in response to "lens 5" being detected, select the fifth UI element that may be offscreen, thereby saving the user from navigation through one or more menus).

The page model 855 is a machine learning scheme trained to detect the keywords: "cheese", "surprise", "woof", "lens 5", and "acme". As with the global model 835 and the multiscreen model 845, in response to the machine learning scheme of the page model 855 detecting any of its keywords, items 840A-840E can be implemented by the action engine 615 or the content engine 620. For example, in response to detecting the keyword "acme" while a given user interface is active, item 840E can be implemented (e.g., while a given user interface is being displayed, in response to "acme" being detected, display user interface content that is associated with a company called Acme). In some example embodiments, the page model and associated content and actions (e.g., item 840E) are updated without updating the other models or items. In this way, items of the narrower page model can be updated without updating the other models so that content activated on a given user interface can be efficiently managed. In some example embodiments, the different models use the same content. For example, each of the models may include a pointer to a location in memory in which content or actions associated with the term "surprise" is stored (i.e., a memory location of item 840B). Thereby enabling efficient updates of content or actions associated with several models.

Each of the models may be associated with one or more of the plurality of user interfaces 805. For example, global model 835 is associated with group 833, including post 815, page 820, and image capture user interface 825. When a user navigates to any one of those user interfaces, the global model 835 is activated by initiating a neural network or template trained to detect keywords pre-selected for the global model 835. Likewise, multiscreen model 845 is associated with group 830, including page 820 and image capture user interface 825. Likewise, page model 855 is associated only with page 820, according to some example embodiments. In response to a given user interface of the plurality of user interfaces 805 being displayed on the client device 102, an associated model is activated. In this way, different sets of user interfaces of the messaging client application 104 can be pre-associated with different models.

In some example embodiments, the global model 835 is a model associated with the greatest amount or all of the user interfaces of the messaging client application 104. For example, if a global model is associated with all the user interfaces of the messaging client application 104 then when the messaging client application 104 is initiated, the global model 835 is activated, thereby enabling detection of keywords spoken by a user and control actions anywhere in the messaging client application 104.

In some example embodiments, the multiscreen model 845 is a model associated with multiple user interfaces of the messaging client application 104. In this way, if a set of user interfaces of an application are of a similar type (e.g., have similar or the same functionality), the multiscreen model 845 is activated to enable the user to perform similar actions in any of the user interfaces that are of the similar type.

The page model 855 is a model associated with a single user interface. In this way, if content or application actions should only be made available within a specific single page, the model 855 is activated when the single page is displayed.

Further, in some example embodiments, the sets of keywords for which the models are trained overlap so that when a narrower model is activated, the functionality of the broader higher-level model is maintained. For example, multiscreen model 845 is trained to detect the same to keywords included in the global model 835 plus three additional keywords. Thus, if a user navigates from post 815, which is associated with the global model 835, to page 820, which is associated with the multiscreen model 845, the user can still control the application using the keyword for which the two models are both trained (e.g., "cheese"), thereby enabling a seamless user experience.

In some example embodiments, each of the models are trained on different sets of keywords. For example, page model 855 can be trained for one keyword, and another page model (not depicted) can be trained to detect another keyword. Further, in some example embodiments, multiple multiscreen models that are trained on entirely different sets of keywords can likewise be implemented.

In some example embodiments, as discussed above, when any of the models 835, 845, and 855 are activated, the interface engine 605 may initiate a microphone and input audio data into the activated model for keyword detection.

Figure 9:
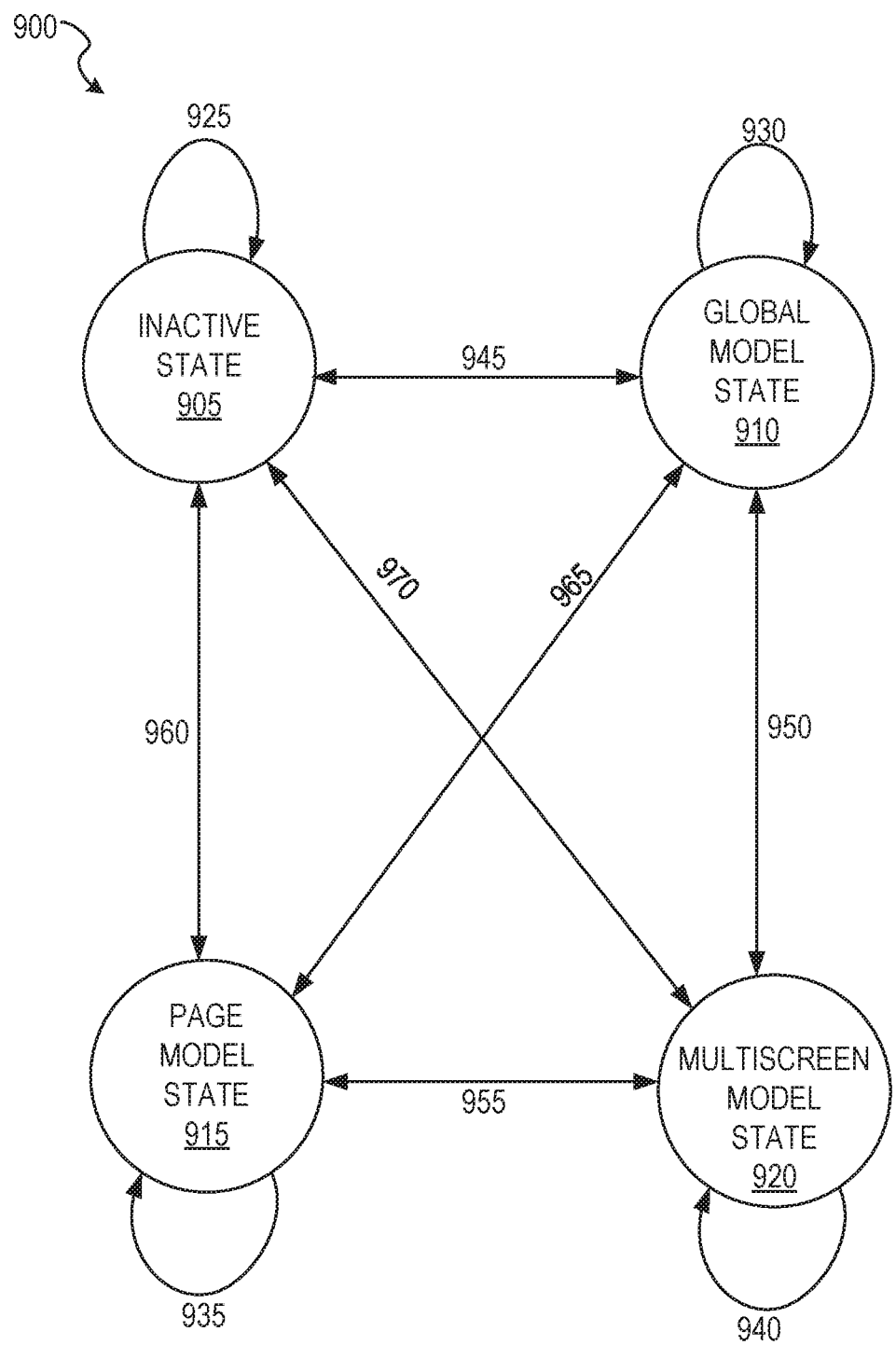
FIG. 9 illustrates a finite state machine for initiating different keyword models, according to some example embodiments.

FIG. 9 illustrates a finite state machine 900 for initiating different keyword models, according to some example embodiments. The finite state machine 900 can be implemented within the interface engine 605, which causes the detection engine 610 to activate and deactivate different models in response to a user navigating to different user interfaces. In some example embodiments, the finite state machine 900 is integrated in an operating system, and navigation of UIs can be controlled in a similar manner. In the example illustrated, the finite state machine 900 includes four states: an inactive state 905, a global model state 910, a page model state 915, and a multiscreen model state 920.

In the inactive state 905, no audio data is recorded and all of the models are inactive. As indicated by loop 925, as long as none of the user interfaces associated with the other states are displayed, the messaging client application 104 remains in the inactive state 905.

If the user navigates to one or more of the user interfaces associated with the global model, the application transitions 945 to the global model state 910. In the global model state 910, the machine learning scheme trained on the global model is activated. Further, in the global model state 910, the interface engine 605 records a portion of audio data in temporary memory (e.g., a thirty second audio data buffer) for input into the global model. As indicated by loop 930, as long as user interfaces associated with the global model state 910 are displayed or otherwise active in the messaging client application 104, the application 114 remains in the global model state 910.

If the user navigates to one or more of the user interfaces associated with the multiscreen model, the application transitions 950 to the multiscreen model state 920. In the multiscreen model state 920, the other models (e.g. global model, page model) are deactivated and the multiscreen model is made active (e.g., a neural network trained to detect keywords of the multiscreen model is activated). Further, in the multiscreen model state 920, the interface engine 605 records last 30 seconds of audio data for input into the multiscreen model. As indicated by loop 940, as long as user interfaces associated with the multiscreen model state 920 are displayed or otherwise active in messaging client application 104, the messaging client application 104 remains in the multiscreen model state 920.

If the user navigates to one or more user interfaces associated with the page model state 915, the application transitions 955 to the page model state 915. In the page model state 915, the other models (e.g. the global model, the multiscreen model) are deactivated, and the page model is active (e.g. a neural network trained to detect keywords in the page model is activated). Further, in the page model state 915, the interface engine 605 records the last 30 seconds of audio data for input into the page model state 915. As indicated by loop 935, as long as user interfaces associated with the page model state 915 are displayed or otherwise active in messaging client application 104, the messaging client application 104 remains in the page model state 915.

If the user navigates to one or more user interfaces that are not associated with any of the models, the messaging client application 104 transitions 960 to the inactive state 905 and recording of audio data is terminated. Further, as indicated by transitions 970 and 965, the messaging client application 104 may transition between the different states and/or skip models. For example, the messaging client application 104 can transition from the global model state 910 to the page model state 915 through transition 965.

Figure 10:
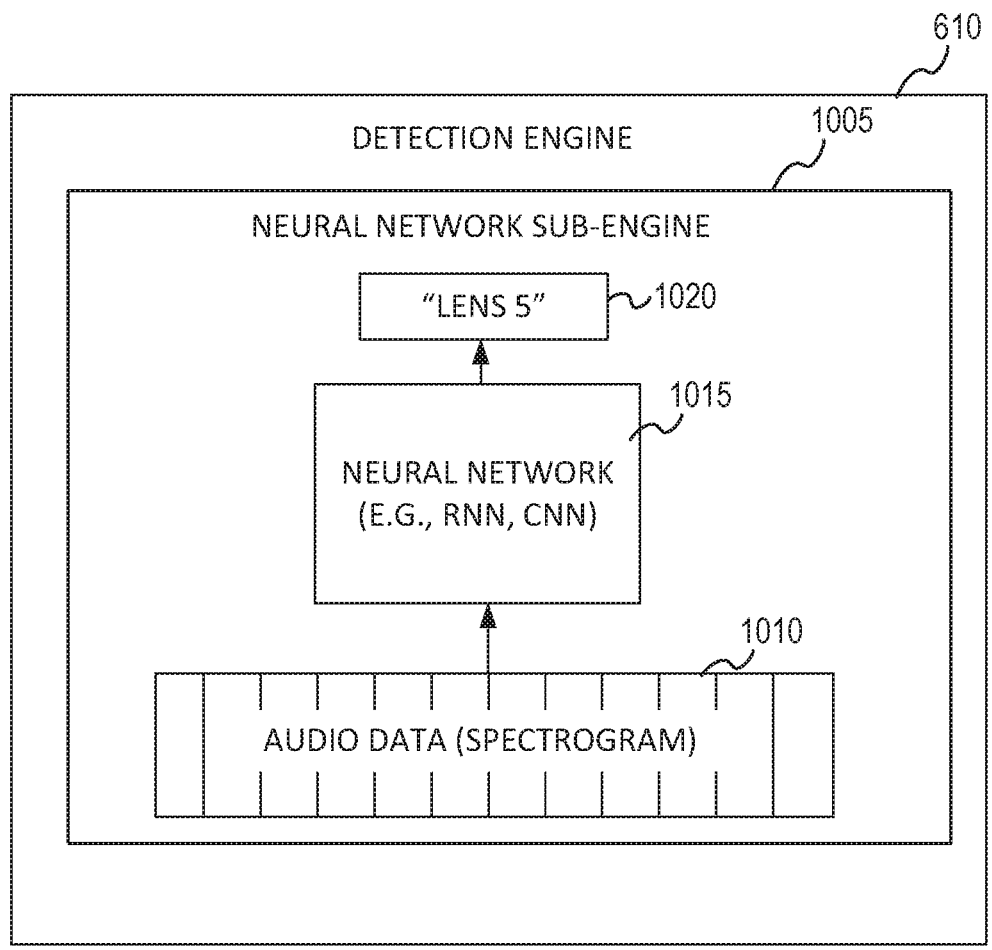
FIG. 10 shows an example configuration of a detection engine implementing a neural network sub-engine, according to some example embodiments.

FIG. 10 shows an example configuration of the detection engine 610 implementing a neural network sub-engine 1005, according to some example embodiments. In some example embodiments, the audio data 1010 generated by the microphone is converted from waveform into a visual representation, such as a spectrogram. In some example embodiments, the audio data 1010 is input into a neural network 1015 for classification.

As illustrated in FIG. 10, in some example embodiments, the neural network engine 1015 implements a recurrent neural network (RNN) to detect keywords. A recurrent neural network is a neural network that shares weight data of the connections across several time steps. That is, each member of an output node is a function of the previous members of that output node. Each member of the output is produced using the same update rule applied to the previous outputs. In some example embodiments, the recurrent neural network is implemented as a bidirectional recurrent neural network that includes a first RNN that moves forward in time (e.g., considering words from the beginning of the sentence to the end of the sentence) and another RNN that moves backwards in time (e.g., processing words from the end of a sentence to the beginning of a sentence). Further, in some example embodiments, the RNN of neural network 1015 implements long short-term memory (LSTM), which are self loops that produce paths where the gradient can flow from longer durations, as is appreciated by those having ordinary skill in the art.

In some example embodiments, the neural network 1015 is configured as a convolutional neural network (CNN) to detect keywords by analyzing visual representations of the keywords (e.g., a spectrogram). A CNN is a neural network configured to apply different kernel filters to an image to generate a plurality of feature maps which can then be processed to identify and classify characteristics of an image (e.g., object feature detection, image segmentation, and so on). As illustrated in FIG. 10, in some example embodiments, a portion of the audio data generated by the microphone of the client device is converted into a visual representation, such as a spectrogram, which is then portioned into slices and input into the neural network 1015 for processing.

As illustrated in FIG. 10, the audio data 1010 is input into the neural network 1015, which outputs the detected keyword 1020. Although one keyword ("lens 5") is displayed in FIG. 10, it is appreciated by those having ordinary skill in the art that the neural network 1015 can output a classification score for each of the keywords for which the neural network is trained. In some example embodiments, the keyword that has highest classification score is output as a detected keyword (e.g., detected keyword 1020).

Figure 11:
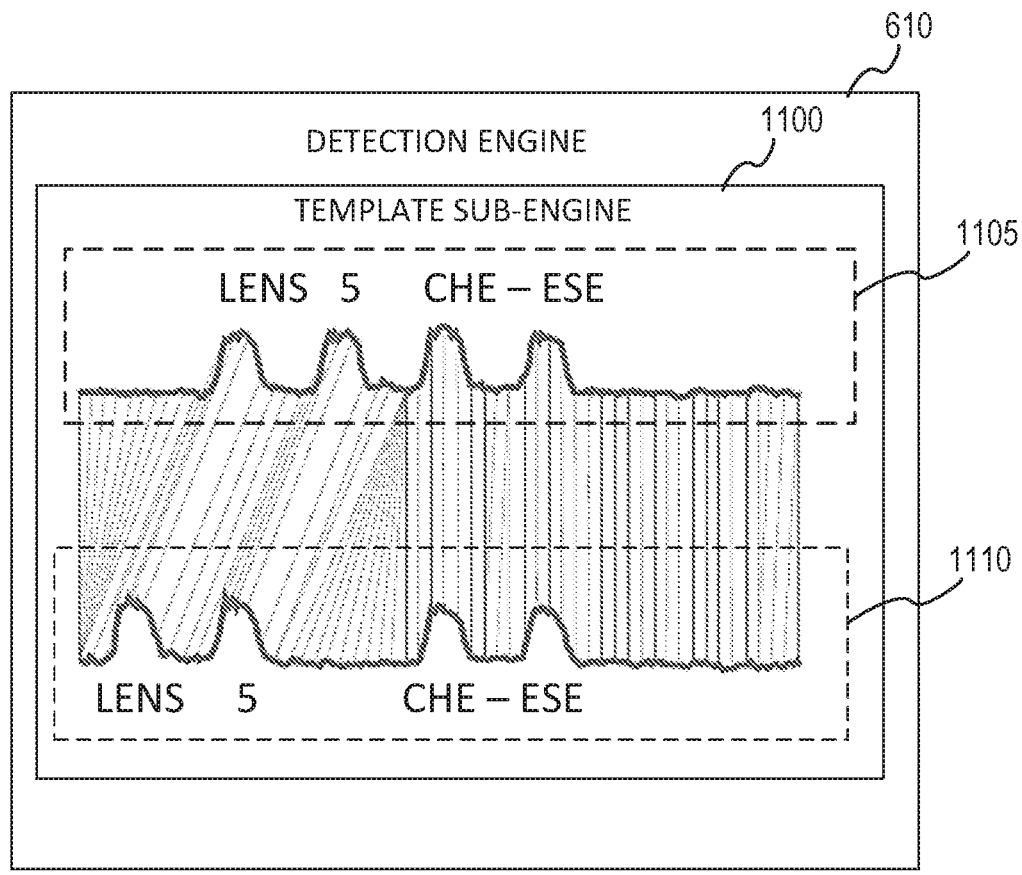
FIG. 11 shows an example embodiment of the detection engine implementing a template sub-engine, according to some example embodiments.

FIG. 11 shows an example embodiment of the detection engine 610 implementing a template sub-engine 1100, according to some example embodiments. The template sub-engine 1100 uses a plurality of waveform templates to detect keywords, such as waveform template 1105, which detects two keywords: "lens 5" and "cheese". In the example embodiment illustrated in FIG. 11, the keyword "lens 5" activates a video filter, and the keyword "cheese" captures an image of the user with the video filter activated. The template sub-engine 1100 can receive a portion of audio data 1110 and determine that the shape of waveforms in audio data 1110 is similar to the shape of wave forms in a waveform template 1105, thereby detecting one or more keywords.

Figure 12:
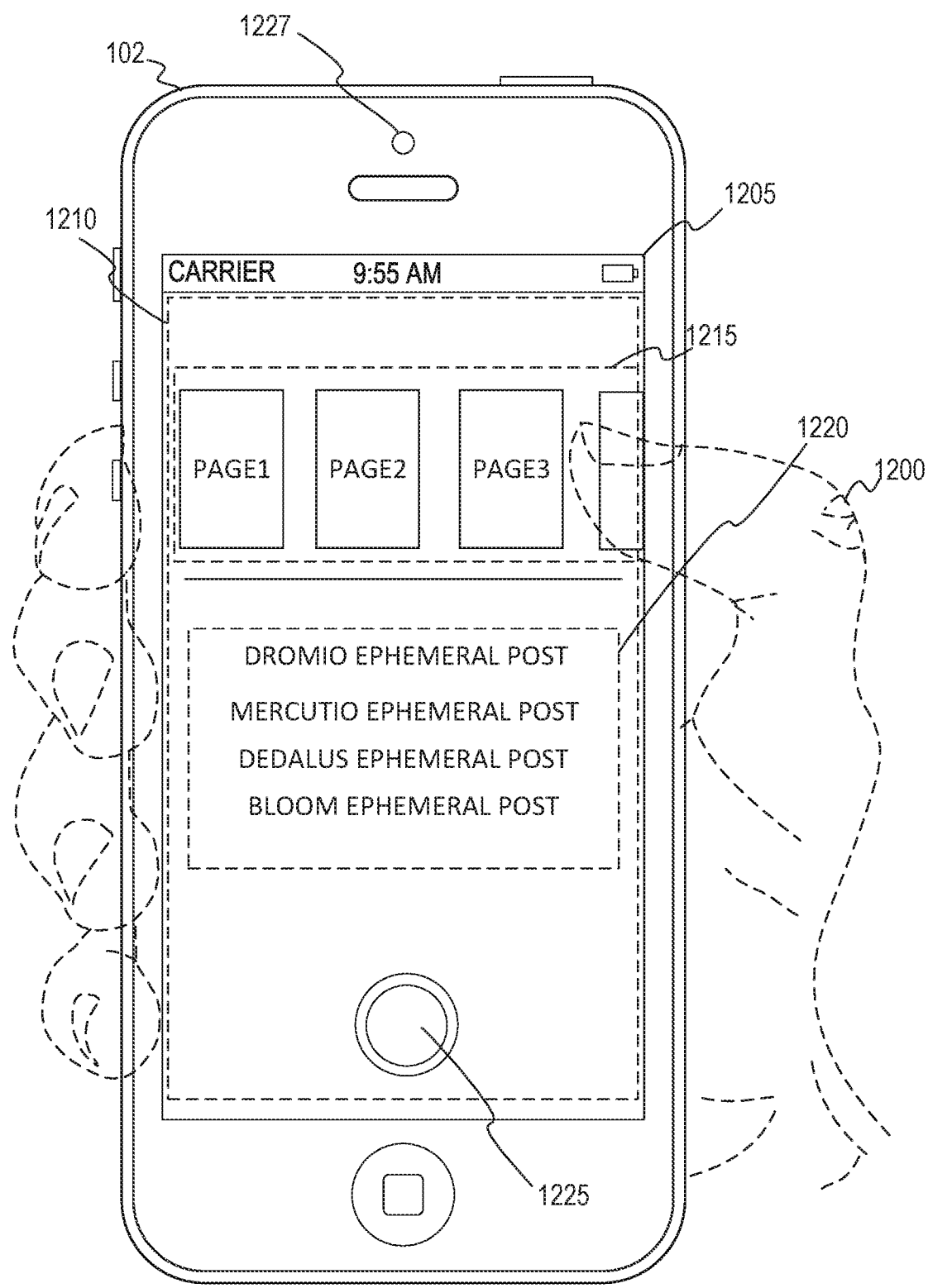
FIG. 12 shows a main window user interface on a display device of the client device, according to some example embodiments.

FIG. 12 shows a main window user interface 1210 on a display device 1205 of the client device 102, according to some example embodiments. The main window user interface 1210 includes a page area 1215 that displays thumbnails that are links to a plurality of pages. If a user 1200 selects one of the thumbnails (e.g., the thumbnail "Page 1"), then the messaging client application 104 displays the page linked to the thumbnail. The main window user interface 1210 further includes a post area 1220 that displays a plurality of post links that link to different ephemeral messages published by a network site. If the user 1200 selects one of the post links, the messaging client application 104 displays the associated ephemeral message on the display device 1205. Further, the main window user interface 1210 includes a camera user interface element 1225 (e.g., a selectable button). If the user 1200 selects the camera user interface element 1225, the application displays a camera capture user interface, in which the user can generate one or more images using an image sensor 1227. In some example embodiments, while the main window user interface 1210 is displayed, the application 1014 is in an inactive state in which no audio is recorded and no keyword model is activated. Further, in some example embodiments, the global model is activated so that the user can initiate an image capture using the image sensor 1227 anywhere in the messaging client application 104.

Figure 13:
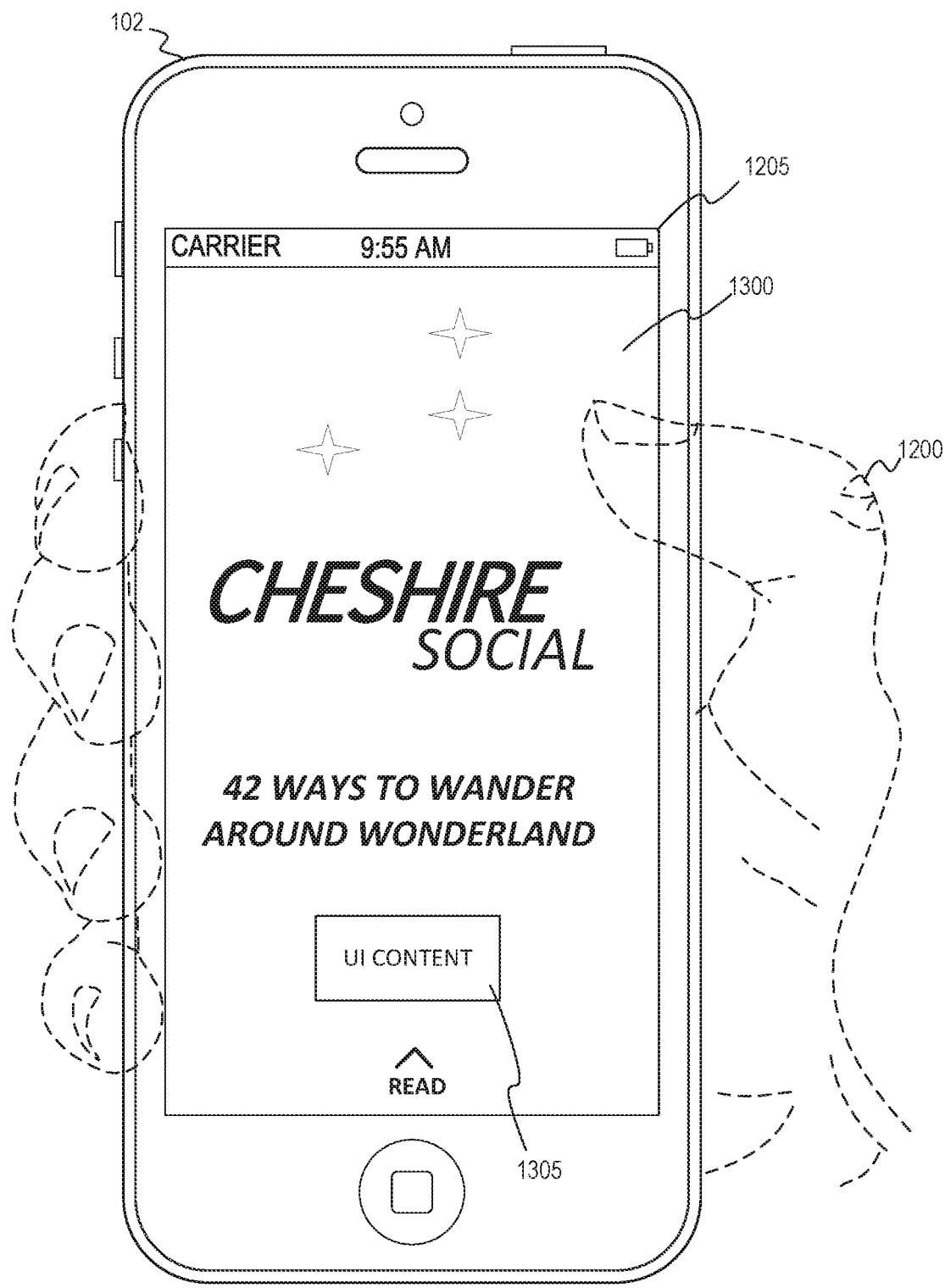
FIG. 13 shows an example page user interface, according to some example embodiments.

FIG. 13 shows an example page user interface 1300, according to some example embodiments. The page user interface 1300 is displayed in response to the user 1200 selecting one of the page thumbnails in the page area 1215. In some example embodiments, when the user 1200 navigates to any of the pages, the multiscreen model is activated to detect keywords spoken by the user 1200. For example, in response to the user 1200 speaking a keyword detected by the multiscreen model, the user interface content 1305 may be displayed in the user interface 1300. As a further example, while the page user interface 1300 is displayed, if the user 1200 speaks one of the keywords of the multiscreen model, the action engine can cause the client device 102 to navigate to an external website (e.g., an external website of a company/organization that created or published the "Cheshire Social" page).

Figure 14:
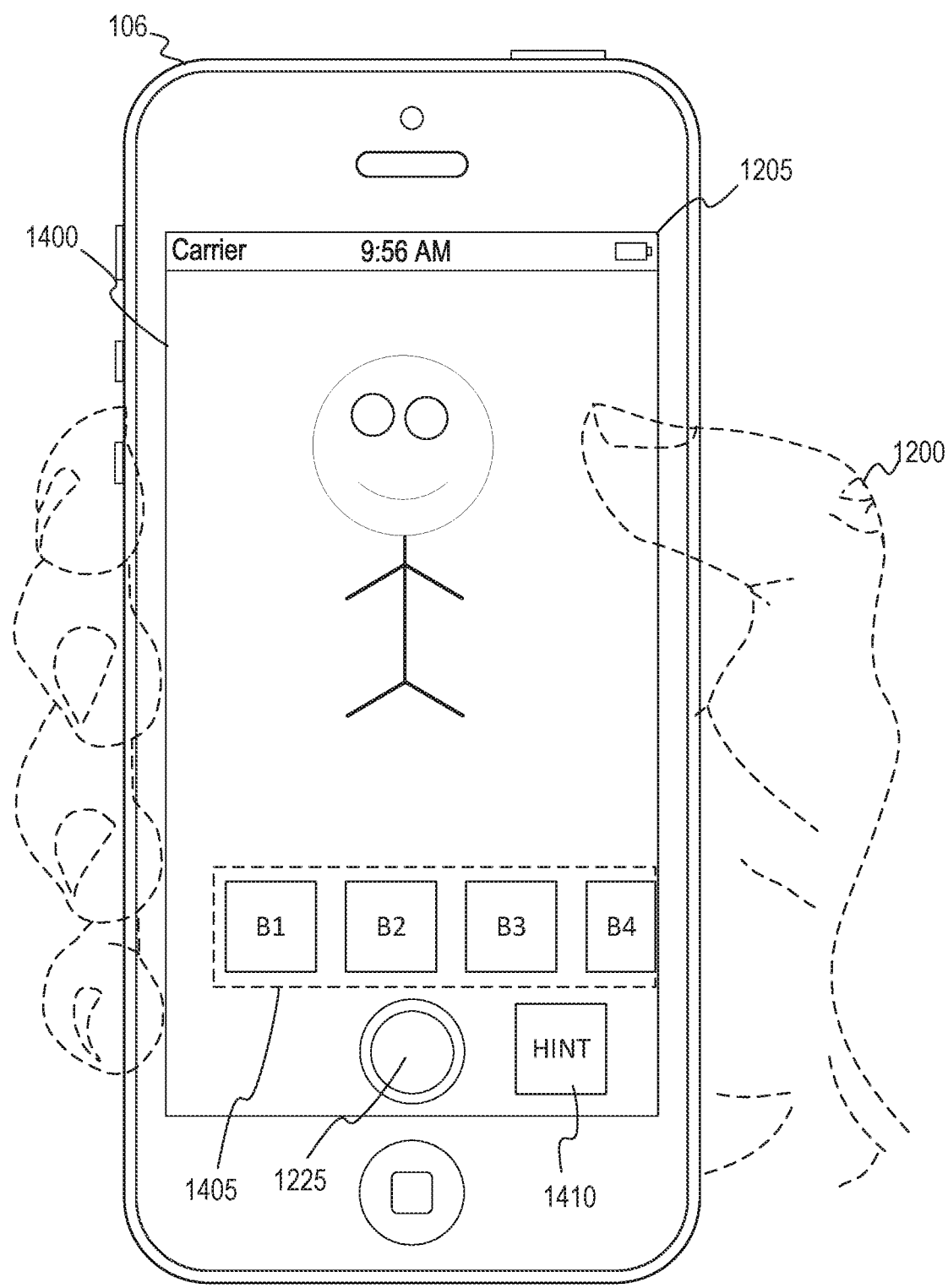
FIG. 14 displays an example image capture user interface, according to some example embodiments.

FIG. 14 displays an example image capture user interface 1400, according to some example embodiments. The image capture user interface 1400 can be displayed in response to the user 1200 selecting the camera user interface element 1225 or verbally speaking a keyword detected by the global model (e.g., "cheese"). The image capture user interface 1400 further displays a plurality of filter buttons 1405 and a carousel, which the user 1200 can scroll through using a swipe gesture. The plurality of filter buttons 1405 include: "B1", "B2", "B3", "B4", and additional filter buttons such as "B5", "B25" that are offscreen, and not viewable on the display device 1205. In some example embodiments, to quickly navigate to objects that are offscreen and not viewable on the display device 1205, the user 1200 can verbally speak "lens 5", which can be detected by the page model active for the image capture user interface 1400. In response to the "lens 5" keyword being detected, the action engine 615 scrolls the carousel so that "B5" is viewable on the display device 1205. Further, the action engine 615 may automatically cause a video filter correlated with the filter button "B5" to be applied to the image being displayed in the image capture user interface 1400.

Further displayed in image capture user interface 1400 is a user interface hint 1410, which can prompt the user 1200 to verbally speak one or more terms to cause additional actions on the messaging client application 104. For example, the user interface hint 1410 can include the sentence "What sound does a cat make?" If the user 1200 verbally speaks "meow", additional UI content or actions may be performed by the audio control system 210, as discussed above.

Figure 15:
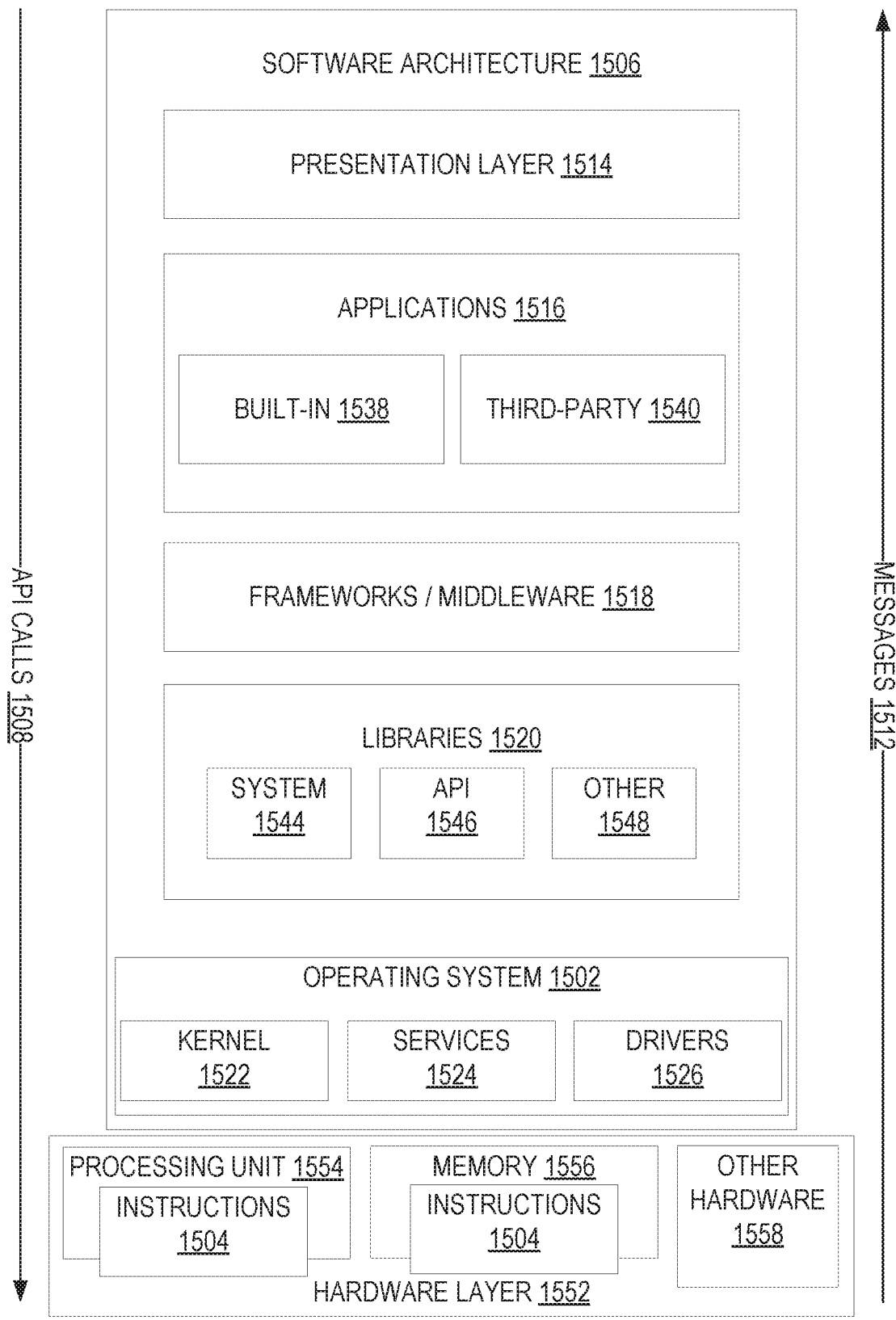
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors, memory, and input/output (I/O) components. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke API calls 1508 through the software stack and receive a response in the form of messages 1512. The layers illustrated are representative in nature, and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1514. In these systems, the application/component "logic" can be separated from the aspects of the application/component that interact with a user.

Figure 16:
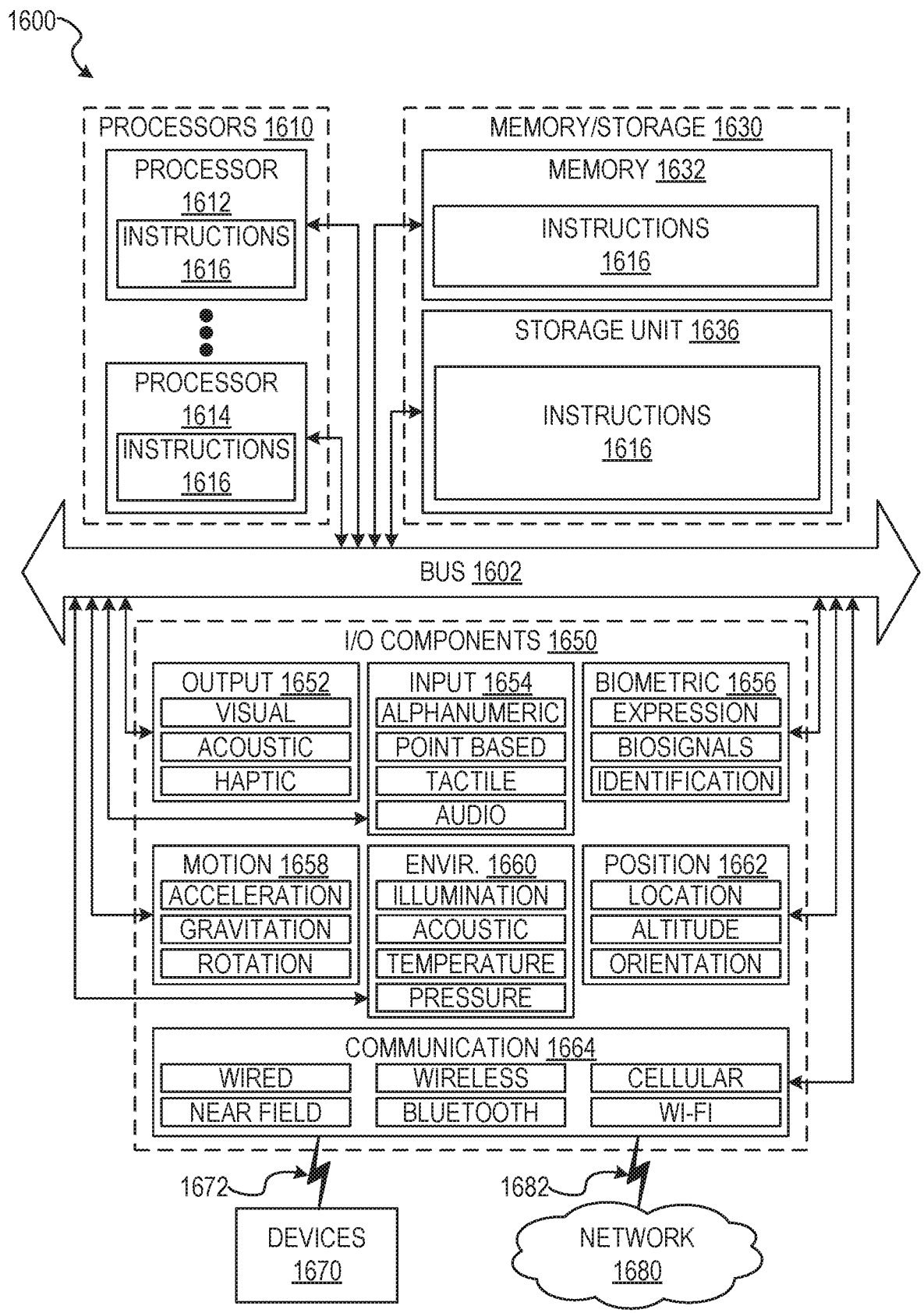
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processors 1612 or 1614), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion, and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    displaying, on a display device of a client device, a plurality of user interfaces from an application that is active on the client device, the plurality of user interfaces comprising a post user interface of an ephemeral message, a page user interface of a non-ephemeral message, and an image capture user interface;
    in response to the plurality of user interfaces being displayed, storing, in memory of the client device, audio data generated from a transducer on the client device;
    in response to the plurality of user interfaces being displayed, identifying a machine learning scheme corresponding to each user interface of the plurality of user interfaces being displayed, from a plurality of machine learning schemes, each machine learning scheme being pre-associated with a corresponding user interface of the application, the plurality of machine learning schemes comprising a global model, a multi screen model, and a page model, the global model being pre-associated with the post user interface, the multi-screen model being pre-associated with the page user interface and the image capture user interface, the page model being pre-associated with the page user interface;
    activating the identified machine learning scheme corresponding to each user interface of the plurality of user interfaces, the machine learning scheme comprising a machine learning model that is trained to detect a set of one or more keywords in audio data, the machine learning scheme being one of the plurality of machine learning schemes stored on the client device, each of the plurality of machine learning schemes being trained with different sets of one or more keywords;
    in response to the plurality of user interfaces being displayed, detecting, using the machine learning scheme, a portion of the audio data as one of the keywords used to train the machine learning scheme; and
    in response to detecting the portion of the audio data as one of the keywords, displaying user interface content pre-associated with the one of the keywords.

2. The method of claim 1, wherein the application comprises a messaging application.

3. The method of claim 2, further comprising:
    displaying, on the display device of the client device, an additional user interface from the plurality of user interfaces;
    in response to displaying the additional user interface, activating an additional machine learning scheme from the plurality of machine learning schemes on the client device, the additional machine learning scheme being trained to detect an additional keyword that is not in the set of one or more keywords used to train the machine learning scheme; and detecting, using the additional machine learning scheme, an additional portion of the audio data as the additional keyword; and in response to detecting the additional portion of the audio data as the additional keyword, displaying additional user interface content pre-associated with the additional keyword.

4. The method of claim 1, wherein the different sets of one or more keywords includes a first set of keywords and a second set of keywords, the first set of keywords including at least one keyword that is not in the second set of keywords.

5. The method of claim 1, wherein one or more of the plurality of machine learning schemes is a neural network configured to process audio data.

6. The method of claim 5, wherein the neural network is a recurrent neural network.

7. The method of claim 1, wherein one or more of the plurality of machine learning schemes is configured to identify portions of audio data as keywords using audio template matching data.

8. The method of claim 1, wherein displaying user interface content includes displaying an image effect on one or more images that are captured using an image capture sensor on the client device.

9. The method of claim 1, wherein displaying user interface content includes displaying a selection of one or more user interface elements of the user interface being displayed on the client device.

10. The method of claim 1, wherein displaying user interface content includes generating an image using the client device; and displaying the image on the display device as the user interface content.

11. The method of claim 1, wherein each of the set of one or more of the keywords used for training has pre-associated user interface content that is displayable upon a given keyword being detected by one of the machine learning schemes.

12. The method of claim 1, further comprising:
publishing, to a network site, the user interface content displayed in response to detecting the portion of the audio data using the machine learning scheme.

13. The method of claim 1, further comprising:
displaying a visual instruction on the display device that prompts a user of the client device to speak, wherein the visual instruction is pre-associated with the one of the keywords detected in the portion of the audio data.

14. The method of claim 1, further comprising:
activating a global model machine learning scheme corresponding to the plurality of user interfaces, the global model machine learning scheme comprising a first machine learning model that is trained to detect a first set of keywords in audio data;
in response to the plurality of user interfaces being displayed, detecting, using the global model machine learning scheme, a first portion of the audio data as one of the first set of keywords used to train the global machine learning scheme;
in response to detecting the one of the first set of keywords, displaying a second user interface pre-associated with a second set of keywords;
activating a page model machine learning scheme corresponding to the second user interface, the page model machine learning scheme comprising a second machine learning model that is trained to detect the second set of keywords in audio data;

in response to the second user interface being displayed, detecting, using the page model machine learning scheme, a second portion of the audio data as one of the second set of keywords used to train the page model machine learning scheme;
in response to detecting the second portion of the audio data as one of the second set keywords, displaying a user interface element pre-associated with the one of the second set of keywords.

15. The method of claim 14, wherein the second user interface comprises a first plurality of user interface elements, wherein the method further comprises:
scrolling the first plurality of user interface elements and displaying the user interface element as a continuation of the first plurality of user interface elements.

16. The method of claim 1, wherein the audio data is buffered such that only a most recent predetermined period of time is stored in the memory of the client device.

17. A system comprising:
one or more processors of a client device; and
a memory storing instructions that, when executed by the one or more processors, cause the system to perform operations comprising:
displaying, on a display device of a client device, a plurality of user interfaces from an application that is active on the client device, the plurality of user interfaces comprising a post user interface of an ephemeral message, a page user interface of a non-ephemeral message, and an image capture user interface;
in response to the plurality of user interfaces being displayed, storing, in memory of the client device, audio data generated from a transducer on the client device;
in response to the plurality of user interfaces being displayed, identifying a machine learning scheme corresponding to each user interface of the plurality of user interfaces being displayed, from a plurality of machine learning schemes, each machine learning scheme being pre-associated with a corresponding user interface of the application, the plurality of machine learning schemes comprising a global model, a multi-screen model, and a page model, the global model being pre-associated with the post user interface, the multi-screen model being pre-associated with the page user interface and the image capture user interface, the page model being pre-associated with the page user interface;
activating the identified machine learning scheme corresponding to each user interface of the plurality of user interfaces, the machine learning scheme comprising a machine learning model that is trained to detect a set of one or more keywords in audio data, the machine learning scheme being one of the plurality of machine learning schemes stored on the client device, each of the plurality of machine learning schemes being trained with different sets of one or more keywords;
in response to the plurality of user interfaces being displayed, detecting, using the machine learning scheme, a portion of the audio data as one of the keywords used to train the machine learning scheme; and
in response to detecting the portion of the audio data as one of the keywords, displaying user interface content pre-associated with the one of the keywords.

18. The system of claim 17, wherein the application comprises a messaging application.

19. A non-transitory machine-readable storage device embodying instructions that, when executed by a device, cause the device to perform operations comprising:

displaying, on a display device of a client device, a plurality of user interfaces from an application that is active on the client device, the plurality of user interfaces comprising a post user interface of an ephemeral message, a page user interface of a non-ephemeral message, and an image capture user interface;

in response to the plurality of user interfaces being displayed, storing, in memory of the client device, audio data generated from a transducer on the client device;

in response to the plurality of user interfaces being displayed, identifying a machine learning scheme corresponding to each user interface of the plurality of user interfaces being displayed, from a plurality of machine learning schemes, each machine learning scheme being pre-associated with a corresponding user interface of the application, the plurality of machine learning schemes comprising a global model, a multi-screen model, and a page model, the global model being pre-associated with the post user interface, the multi-screen model being pre-associated with the page user interface and the image capture user interface, the page model being pre-associated with the page user interface;

activating the identified machine learning scheme corresponding to each user interface of the plurality of user interfaces, the machine learning scheme comprising a machine learning model that is trained to detect a set of one or more keywords in audio data, the machine learning scheme being one of the plurality of machine learning schemes stored on the client device, each of the plurality of machine learning schemes being trained with different sets of one or more keywords;

in response to the plurality of user interfaces being displayed, detecting, using the machine learning scheme, a portion of the audio data as one of the keywords used to train the machine learning scheme; and in response to detecting the portion of the audio data as one of the keywords, displaying user interface content pre-associated with the one of the keywords.

20. The machine-readable medium of claim 19, wherein the application comprises a messaging application.

* * * * *

UNITED STATES PATENT AND TRADEMARK OFFICE
CERTIFICATE OF CORRECTION

PATENT NO. : 11,487,501 B2
APPLICATION NO. : 15/981295
DATED : November 1, 2022
INVENTOR(S) : Chen et al.

It is certified that error appears in the above-identified patent and that said Letters Patent is hereby corrected as shown below:

On the Title Page

On page 3, in Column 1, item (56) under "Foreign Patent Documents", Line 3, delete "201 4194262" and insert --2014194262-- therefor On page 3, in Column 1, item (56) under "Foreign Patent Documents", Line 4, delete "201 5192026" and insert --2015192026-- therefor On page 3, in Column 1, item (56) under "Foreign Patent Documents", Line 6, delete "201 6065131" and insert --2016065131-- therefor On page 3, in Column 1, item (56) under "Foreign Patent Documents", Line 8, delete "201 6/112299" and insert --2016/112299-- therefor On page 3, in Column 2, item (56) under "Foreign Patent Documents", Line 1, delete "201 6179166" and insert --2016179166-- therefor On page 3, in Column 2, item (56) under "Foreign Patent Documents", Line 2, delete "201 6179235" and insert --201679235-- therefor On page 3, in Column 2, item (56) under "Foreign Patent Documents", Line 3, delete "201 7176739" and insert --2017176739-- therefor On page 3, in Column 2, item (56) under "Foreign Patent Documents", Line 4, delete "201 7176992" and insert --2017176992-- therefor On page 3, in Column 2, item (56) under "Other Publications", Line 60, delete "Appiication" and insert --Application-- therefor Signed and Sealed this
Twelfth Day of September, 2023

Katherine Kelly Vidal
*Director of the United States Patent and Trademark Office*

In the Claims

In Column 24, Line 31, in Claim 1, delete "multi screen" and insert --multi-screen-- therefor In Column 25, Line 33, in Claim 10, delete "device;" and insert --device,-- therefor